(12) United States Patent
Kim et al.

(10) Patent No.: US 10,305,705 B2
(45) Date of Patent: May 28, 2019

(54) SIGNAL RECEIVER CIRCUIT AND METHOD FOR ADJUSTING WEIGHT OF COMPENSATOR

(71) Applicants: SK hynix Inc., Gyeonggi-do (KR); Seoul National University R&DB Foundation, Seoul (KR)

(72) Inventors: Suhwan Kim, Seoul (KR); Min-Chang Kim, Seoul (KR); Deog-Kyoon Jeong, Seoul (KR)

(73) Assignees: SK hynix Inc., Gyeonggi-do (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/845,318

(22) Filed: Dec. 18, 2017

(65) Prior Publication Data
US 2018/0343149 A1  Nov. 29, 2018

(30) Foreign Application Priority Data
May 24, 2017 (KR) .................. 10-2017-0064174

(51) Int. Cl.
| | | |
|---|---|---|
| H04L 25/03 | (2006.01) | |
| H04B 1/12 | (2006.01) | |
| H04L 25/02 | (2006.01) | |

(52) U.S. Cl.
CPC ....... *H04L 25/03063* (2013.01); *H04B 1/123* (2013.01); *H04L 25/0202* (2013.01); *H04L 25/03885* (2013.01)

(58) Field of Classification Search
CPC ............................................. H04L 25/03063
USPC ........................................................ 375/233
See application file for complete search history.

(56) References Cited

U.S. PATENT DOCUMENTS

| | | | |
|---|---|---|---|
| 3,588,705 A * | 6/1971 | Paine | H03G 3/345 327/165 |
| 7,230,983 B2 | 6/2007 | Yousef et al. | |
| 2013/0148712 A1* | 6/2013 | Malipatil | H04L 25/0307 375/233 |
| 2014/0226707 A1 | 8/2014 | Kaviani et al. | |
| 2016/0241421 A1* | 8/2016 | Lim | H04L 25/0272 |

OTHER PUBLICATIONS

Chi, H-J. et al., A Single-Loop SS-LMS Algorithm With Single-Ended Integrating DFE Receiver for Multi-Drop DRAM Interface, IEEE Journal of Solid-State Circuits, Sep. 2011, vol. 46, No. 9.

* cited by examiner

*Primary Examiner* — Lihong Yu
(74) *Attorney, Agent, or Firm* — IP & T Group LLP

(57) ABSTRACT

A signal receiver circuit may include: a receiver suitable for generating a received signal based on comparison of an input signal with a reference voltage during a normal operation and based on comparison of the input signal with a target voltage during a training operation; a compensator suitable for applying a weight to the received signal to compensate for the input signal; and a weight adjuster suitable for adjusting the weight based on a level of the received signal during the training operation, wherein during the training operation, the input signal toggles between first and second levels, and the receiver is enabled when the input signal is at the first level.

16 Claims, 11 Drawing Sheets

SIGNAL RECEIVER CIRCUIT AND METHOD FOR ADJUSTING WEIGHT OF COMPENSATOR

CROSS-REFERENCE TO RELATED APPLICATIONS

This application claims priority under 35 U.S.C. § 119 to Korean Patent Application No. 10-2017-0064174 filed on May 24, 2017, the disclosure of which is incorporated herein by reference in its entirety.

BACKGROUND

1. Field

The present disclosure relates to a signal receiver circuit. Particularly, the present disclosure relates to a circuit and method for receiving a signal (data) in an integrated circuit.

2. Description of the Related Art

The development in performance of electrical systems such as a computer and memory has gradually increased the data processing rate. However, the limited bandwidth of channels between electrical components may result in distorting original data due to ISI (Inter-Symbol Interference) and reduce the voltage margin and time margin, thereby limiting the performance of the transmitting/receiving components of an electrical system.

Therefore, a decision feedback equalizer (DFE) is used to compensate for distortions caused by ISI by a process of subtracting a certain value from current data, the value being obtained by applying a weight to the previous data. For a precise compensation operation of the DFE, the weight needs to be set to the optimal value.

SUMMARY

Various embodiments are directed to a technique for correctly receiving a signal by compensating for a distortion caused by ISI.

In an embodiment, a signal receiver circuit may include: a receiver suitable for generating a received signal based on comparison of an input signal with a reference voltage during a normal operation and based on comparison of the input signal with a target voltage during a training operation; a compensator suitable for applying a weight to the received signal to compensate for the input signal; and a weight adjuster suitable for adjusting the weight based on a level of the received signal during the training operation, wherein during the training operation, the input signal toggles between first and second levels, and the receiver is enabled when the input signal is at the first level.

In an embodiment, a method of adjusting a weight of a) compensator may include: applying an input signal to toggle between first and second levels; generating a received signal by comparing the input signal and a target voltage when the input signal is at the first level; increasing or decreasing a weight in response to a level of the received signal; and compensating for the input signal by applying the weight to the received signal.

In an embodiment, there is provided a signal receiver circuit that operates based on a plurality of phase clocks having different phases. The signal receiver circuit may include: a first receiver suitable for generating a first received signal based on comparison of an input signal with a reference voltage during a normal operation and based on comparison of the input signal with a target voltage during a training operation, and for operating in synchronization with a first phase clock; a second receiver suitable for generating a second received signal based on comparison of the input signal with the reference voltage during the normal operation and based on comparison of the input signal with the target voltage during the training operation, and for operating in synchronization with a second phase clock; a third receiver suitable for generating a third received signal based on comparison of the input signal with the reference voltage during the normal operation and based on comparison of the input signal with the target voltage during the training operation, and for operating in synchronization with a third phase clock; a fourth receiver suitable for generating a fourth received signal based on comparison of the input signal with the reference voltage during the normal operation and based on comparison of the input signal with the target voltage during the training operation, and for operating in synchronization with the fourth phase clock; a first compensator suitable for applying a first weight to the fourth received signal, applying a second weight to the third received signal, and applying a third weight to the second received signal to compensate for a receiving operation of the first receiver; a second compensator suitable for applying the first weight to the first received signal, applying the second weight to the fourth received signal, and applying the third weight to the third received signal to compensate for a receiving operation of the second receiver; a third compensator suitable for applying the first weight to the second received signal, applying the second weight to the first received signal, and applying the third weight to the fourth received signal to compensate for a receiving operation of the third receiver; a fourth compensator suitable for applying the first weight to the third received signal, applying the second weight to the second received signal, and applying the third weight to the first received signal to compensate for a receiving operation of the fourth receiver; a first weight adjuster suitable for adjusting the first weight based on the first received signal during the training operation; a second weight adjuster suitable for adjusting the second weight based on the second received signal during the training operation; and a third weight adjuster suitable for adjusting the third weight based on the third received signal during the training operation.

DETAILED DESCRIPTION

Figure 1:
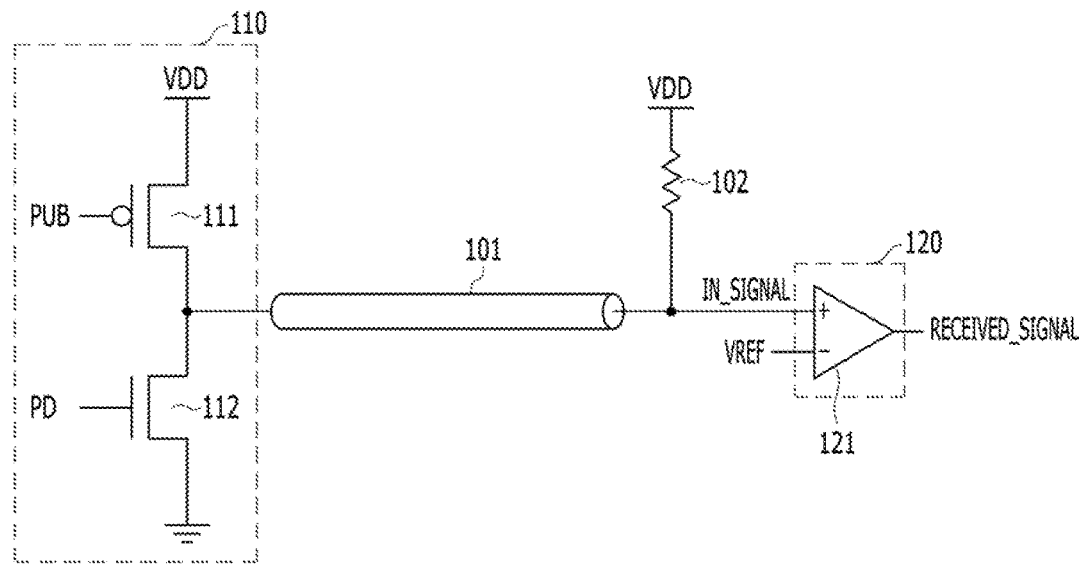
FIG. 1 illustrates a signal transmitter circuit 110 and a signal receiver circuit 120 in accordance with one exemplary embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a signal transmitter circuit 110 and a signal receiver circuit 120 in accordance with one exemplary embodiment.

Referring to FIG. 1, the signal transmitter circuit 110 may include a pull-up driver 111 and a pull-down driver 112. When a pull-up signal PUB is activated to a logic low (L) level, the pull-up driver 111 may be enabled to pull up a channel 101. By the pull-up operation of the pull-up driver 111, the signal transmitter circuit 110 may transmit a logic high signal (data) to the channel 101. When a pull-down signal PD is activated to a logic high (H) level, the pull-down driver 112 may be enabled to pull down the channel 101. By the pull-down operation of the pull-down driver 112, the signal transmitter circuit 110 may transmit a logic low signal (data) to the channel 101.

A termination resistor 102 may terminate the channel 101 to a logic H level at the signal receiver circuit 120. The termination resistor 102 may be used to improve signal integrity (SI) during high-speed signal transmission. FIG. 1 illustrates high termination, but low termination in which the termination resistor 102 terminates the channel 101 to a logic L level may be used.

The signal receiver circuit 120 may include a receiver 121. The receiver 121 may compare the voltage level of an input signal IN_SIGNAL transmitted through the channel 101 with the voltage level of a reference voltage VREF, and generate a received signal RECEIVED_SIGNAL. The receiver 121 may generate the received signal RECEIVED_SIGNAL at a logic H level when the voltage level of the input signal IN_SIGNAL is higher than the voltage level of the reference voltage VREF, and generate the received signal RECEIVED_SIGNAL at a logic L level when the voltage level of the input signal IN_SIGNAL is lower than the voltage level of the reference voltage VREF.

Figure 2:
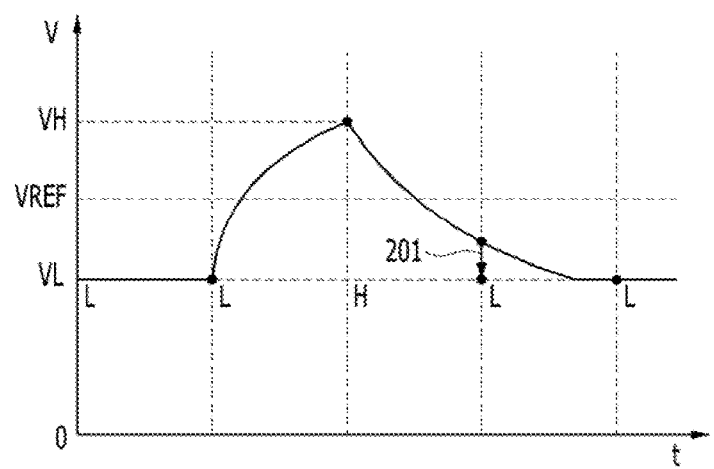
FIG. 2 illustrates voltage levels of a channel 101 when logic L, L, H, L, and L signals are transmitted to the channel 101 of FIG. 1.

FIG. 2 illustrates the voltage levels of the channel 101 when logic L, L, H, L and L signals, are transmitted to the channel 101 of FIG. 1 in accordance with one exemplary embodiment.

In FIG. 2, VH represents the ideal voltage level of a logic H level. When a logic H signal is transmitted to the channel 101, the channel 101 may be pulled up by the pull-up driver 111 and the termination resistor 102. Thus, the ideal voltage level VH may be equal to the level of a supply voltage VDD.

In FIG. 2, VL represents the ideal voltage level of a logic L level. When a logic L signal is transmitted to the channel 101, the channel 101 may be pulled down by the pull-down driver 112 and pulled up by the termination resistor 102. Thus, the ideal voltage level VL may correspond to a value obtained by distributing the supply voltage VDD on the resistance value of the pull-down driver 112 and the resistance value of the termination resistor 102. That is, the ideal voltage level VL may be higher than 0V or the level of a ground voltage. Furthermore, VREF represents the level of the reference voltage VREF, and the reference voltage VREF may have the middle value between VH and VL.

Under an ideal condition with no channel loss, the channel 101 may have a voltage level corresponding to VH when a logic H signal is transmitted through the channel 101, and have a voltage level corresponding to VL when a logic L signal is transmitted through the channel 101.

Under a practical condition with a channel loss, however, a logic L signal may not have a voltage level corresponding to VL, but have a higher voltage level than VL, when the logic L signal is transmitted after a logic H signal was transmitted. In FIG. 2, an arrow 201 may indicate a value which needs to be compensated for, in order to control the logic L signal to have a voltage level corresponding to VL after the logic H signal was transmitted.

Figure 3:
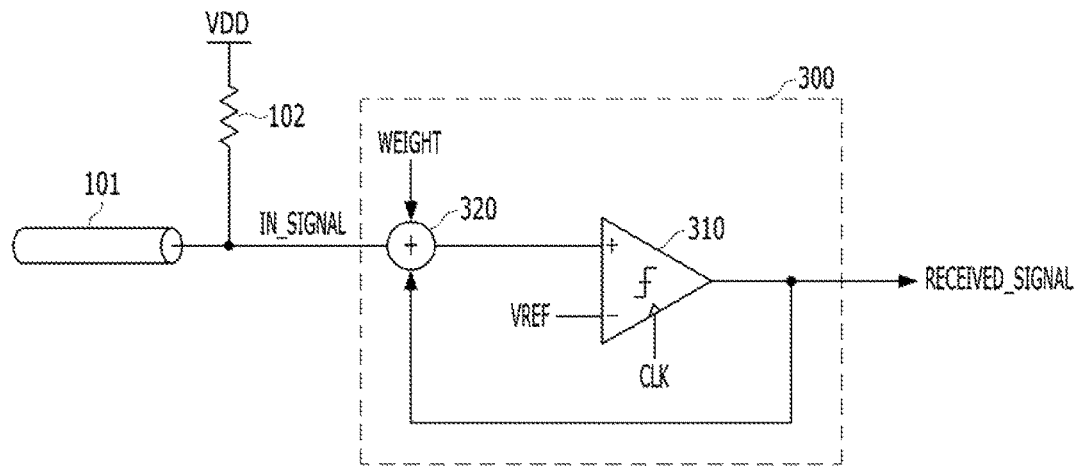
FIG. 3 is a configuration diagram of a signal receiver circuit 300 in accordance with one exemplary embodiment.

FIG. 3 is a configuration diagram of a signal receiver circuit 300 in accordance with one exemplary embodiment.

Referring to FIG. 3 the signal receiver circuit 300 may include a receiver 310 and a compensator 320.

The receiver 310 may compare the level of an input signal IN_SIGNAL to the voltage level of a reference voltage VREF, and generate the received signal RECEIVED_SIGNAL. The receiver 310 may be operated in synchronization with a rising edge of a clock CLK. That is, the receiver may compare the voltage levels of the input signal IN_SIGNAL with the reference voltage VREF at each rising edge of the clock CLK.

The compensator 320 may compensate for the input signal IN_SIGNAL by applying a weight WEIGHT to the received signal RECEIVED_SIGNAL. As described with reference to FIG. 2, the input signal IN_SIGNAL may not have a voltage level corresponding to VL, when a logic L signal is transmitted after a logic H signal was transmitted through the channel 101. In this case, the compensator 320 may perform a compensation operation as indicated by the arrow 201, and control the receiver 310 to perform a receiving operation in the same manner as the input signal IN_SIGNAL is inputted at the voltage level VL. The compensator 320 may compensate for the loss of the input signal IN_SIGNAL through the previous received signal RECEIVED_SIGNAL fed back to an input terminal thereof. Such a compensator 320 may be referred to as a decision feedback equalizer (DFE).

The strength of the compensation operation of the compensator 320 may be decided by the weight WEIGHT. Therefore, the weight WEIGHT needs to be correctly adjusted for a precise compensation operation of the compensator 320.

Figure 4:
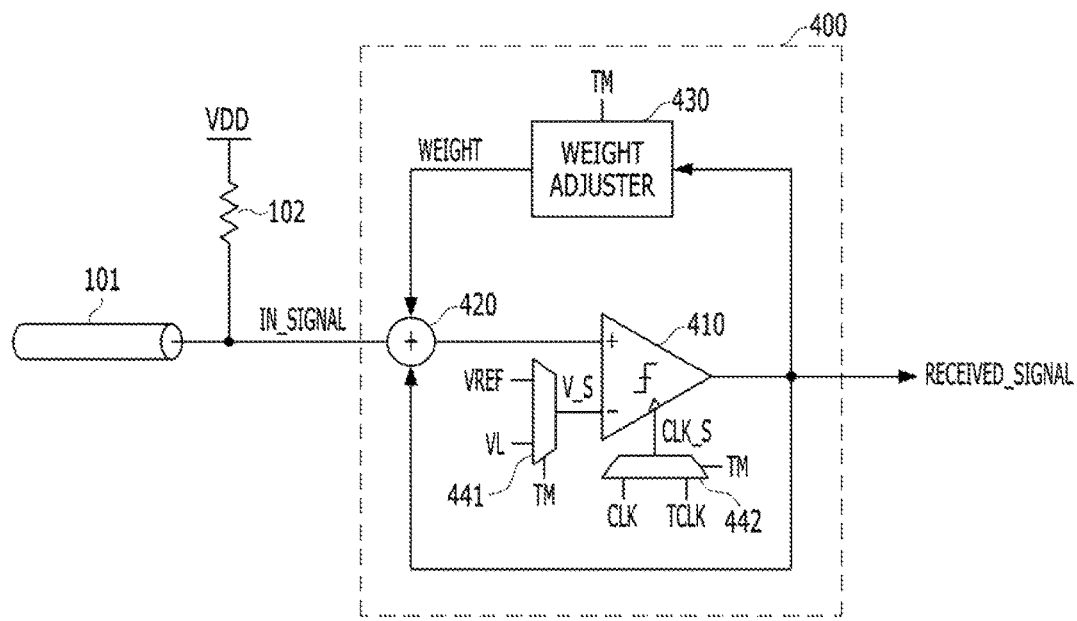
FIG. 4 is a configuration diagram of a signal receiver circuit 400 in accordance with one exemplary embodiment.

FIG. 4 is a configuration diagram of a signal receiver circuit 400 in accordance with one exemplary embodiment. The signal receiver circuit 400 in accordance with one embodiment may further include units for training a weight WEIGHT to the optimal value, when compared to the signal receiver circuit 300 in accordance with one embodiment.

Referring to FIG. 4, the signal receiver circuit 400 may include a receiver 410, a compensator 420, a weight adjuster 430, a first selector 441, and a second selector 442.

The first selector 441 may select a voltage V_S to be compared with an input signal IN_SIGNAL by the receiver 410, and transmit the selected voltage V_S to the receiver 410. The first selector 441 may select a reference voltage VREF and transmit the reference voltage VREF to the receiver 410 during a normal operation, and select a target voltage VL and transmit the target voltage VL to the receiver 410 during a training operation. The target voltage VL may correspond to the target value of a voltage that the input signal IN_SIGNAL needs to have for a logic L level. In other words, the target voltage VL is a voltage that the input signal IN_SIGNAL is adjusted toward by compensation in order for the input signal IN_SIGNAL to be considered as a logic L level. The first selector 441 may distinguish between the normal operation and the training operation using a test mode signal TM. The test mode signal TM may be activated during the training operation for adjusting a weight WEIGHT and may not be activated during the other operations.

The second selector 442 may select a clock CLK_S to supply to the receiver 410 and transmit the selected clock CLK_S to the receiver 410. The second selector 442 may select a normal clock CLK and transmit the normal clock CLK to the receiver 410 during the normal operation, whereas the second selector 442 may select a training clock TCLK and transmit the training clock TCLK to the receiver 410 during the training operation. The second selector 442 may distinguish between the normal operation and the training operation using the test mode signal TM.

The receiver 410 may compare the voltage level of the input signal IN_SIGNAL with the voltage level of the voltage selected by the first selector 411 and generate a received signal RECEIVED_SIGNAL. Specifically, the receiver 410 may generate the received signal RECEIVED_SIGNAL by comparing the voltage level of the input signal IN_SIGNAL with the voltage level of the reference voltage VREF during the normal operation, and generate the received signal RECEIVED_SIGNAL by comparing the voltage level of the input signal IN_SIGNAL with the voltage level of the target voltage VL during the training operation. The receiver 410 may operate in synchronization with the clock CLK_S supplied from the second selector 442. For example, the receiver 410 may compare the voltage levels of the input signal IN_SIGNAL with the reference voltage VREF at each rising edge of the normal clock CLK during the normal operation, and compare the voltage levels of the input signal IN_SIGNAL with the target voltage VL at each rising edge of the training clock TCLK during the training operation.

The weight adjuster 430 may adjust the weight WEIGHT in response to the level of the received signal RECEIVED_SIGNAL during the training operation in which the test mode signal TM is activated. Furthermore, the weight adjuster 430 may fix or hold the weight WEIGHT adjusted by the training operation during the normal operation in which the test mode signal TM is deactivated.

The compensator 420 may compensate for the input signal IN_SIGNAL by applying the weight WEIGHT to the received signal RECEIVED_SIGNAL. As described with reference to FIG. 2 the input signal IN_SIGNAL may not have a level corresponding to the target voltage VL, when a logic L signal is transmitted after a logic H signal was transmitted through the channel 101. In this case, the compensator 420 may perform a compensation operation as indicated by the arrow 201 and control the receiver 410 to perform a receiving operation in the same manner as the input signal IN_SIGNAL is inputted at the level of the target voltage VL. The compensator 420 may compensate for the loss of the input signal IN_SIGNAL by feeding back the previous received signal RECEIVED_SIGNAL. Such a compensator 420 may be referred to as a decision feedback equalizer (DFE).

Figure 5:
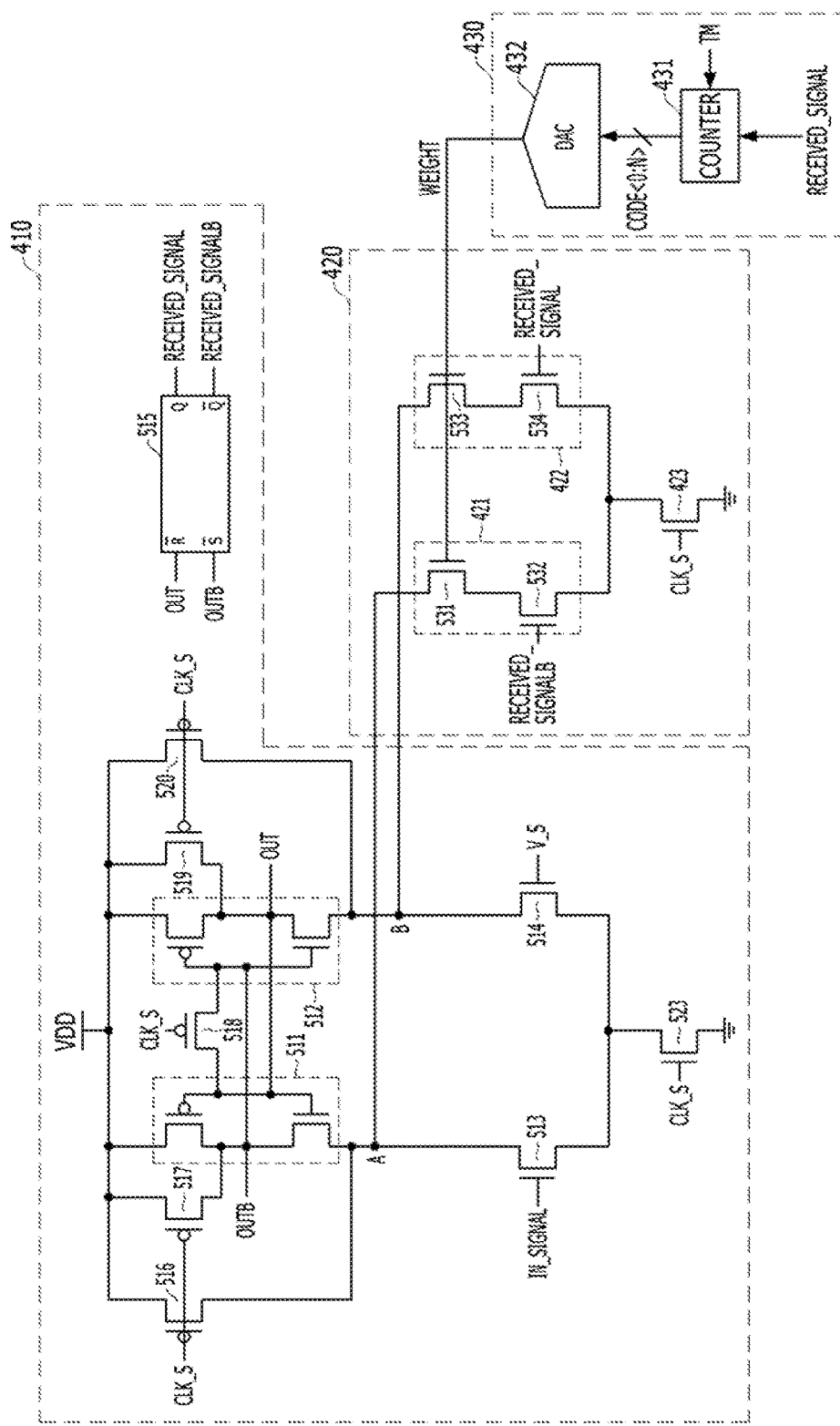
FIG. 5 is an exemplary configuration diagram of a receiver 410, a compensator 420, and a weight adjuster 430 of FIG. 4.

FIG. 5 is an exemplary circuit diagram of the receiver 410, the compensator 420, and the weight adjuster 430 shown in FIG. 4.

Referring to FIG. 5, the weight adjuster 430 may include a counter 431 and a digital-analog converter 432. The counter 431 may increase/decrease the value of a code CODE<0:N> in response to the received signal RECEIVED_SIGNAL. Specifically, the counter may increase the code CODE<0:N> when the received signal RECEIVED_SIGNAL is at a logic H level, and decrease the code CODE<0:N> when the received signal RECEIVED_SIGNAL is at a logic L level. The counter 431 may be enabled during the training operation in which the test mode signal TM is activated, and fix or hold the value of the code CODE<0:N> when the test mode signal TM is deactivated. The digital-analog converter 432 may convert the digital code CODE<0:N> into the weight WEIGHT corresponding to an analog voltage. The digital-analog converter 432 may raise the voltage of the weight WEIGHT as the code CODE<0:N> has a larger value, and lower the voltage of the weight WEIGHT as the code CODE<0:N> has a smaller value. That is, the weight adjuster 430 may adjust the weight WEIGHT to be higher when the received signal RECEIVED_SIGNAL is at a logic H level, and adjust the weight WEIGHT to be lower when the received signal RECEIVED_SIGNAL is at a logic L level.

The receiver 410 may include first and second inverter 511 and 512, a first pull-down driver 513, a second pull-down driver 514, a latch circuit 515, PMOS transistors 516 to 520, and an NMOS transistor 523. The first and second inverters 511 and 512 may be cross-coupled to each other, and the first pull-down driver 513 may pull down a pull-down voltage terminal A of the first inverter 511 in response to the input signal IN_SIGNAL, whereas the second pull-down driver 514 may pull down a pull-down voltage terminal B of the second inverter 512 in response to the voltage V_S supplied from the first selector 441. The latch circuit 515 may latch an output signal OUT outputted from an output terminal of the second inverter 512 and an inverted output signal OUTB outputted from an output terminal of the first inverter 511, and provide the latched signals as the received signal RECEIVED_SIGNAL and the inverted received signal RECEIVED_SIGNALB. Further, the PMOS transistors 516 to 520 may reset the output signal OUT and the inverted output signal OUTB in response to the clock CLK_S supplied from the second selector 442, and the NMOS transistor 523 may enable/disable the first and second pull-down drivers 513 and 523 in response to the clock CLK_S supplied from the second selector 442. Each of the first and second pull-down drivers 513 and 514 may include an NMOS transistor, and the latch circuit 515 may include an SR NAND latch.

While the clock CLK_S supplied from the second selector 442 is at a logic L level, the NMOS transistor 523 may be turned off to disable the first and second pull-down drivers 513 and 514. The PMOS transistors 516 and 520 may be turned on to reset the output signal OUT and the inverted output signal OUTB to a logic H level. At this time, the received signal RECEIVED_SIGNAL and the inverted received signal RECEIVED_SIGNALB which are outputted from the latch circuit 515 may retain the previous values.

While the clock CLK_S supplied from the second selector 442 is at a logic H level, the NMOS transistor 523 may be turned on to enable the first and second pull-down drivers 513 and 514. The PMOS transistors 516 to 522 may be turned off. When the voltage level of the input signal IN_SIGNAL is higher than the level of the voltage V_S, the first pull-down driver 513 may be turned on to a greater extent than the second pull-down driver 514. Thus, the voltage level of the pull-down voltage terminal A of the first inverter 511 may become lower than the voltage level of the pull-down voltage terminal B of the second inverter 512. The first and second inverters 511 and 512 may amplify a voltage level difference between the voltage terminals A and B. As a result, the output signal OUT may be outputted at a logic H level, and the inverted output signal OUTB may be outputted at a logic L level. Thus, the received signal RECEIVED_SIGNAL outputted from the latch circuit 515 may have a logic H level, and the inverted received signal RECEIVED_SIGNALB outputted from the latch circuit 515 may have a logic L level. On the other hand, when the voltage level of the input signal IN_SIGNAL is lower than the level of the voltage V_S, the second pull-down driver 514 may be turned on to a greater extent than the first pull-down driver 513. Thus, the voltage level of the pull-down voltage terminal A of the first inverter 511 may become higher than the voltage level of the pull-down voltage terminal B of the second inverter 512. The first and second inverters 511 and 512 may amplify a voltage level difference between the voltage terminals A and B. As a result, the output signal OUT may be outputted at a logic L level, and the inverted output signal OUTB may be outputted at a logic H level. Thus, the received signal RECEIVED_SIGNAL outputted from the latch circuit 515 may have a logic L level, and the inverted received signal RECEIVED_SIGNALB outputted from the latch circuit 515 may have a logic H level.

The compensator 420 may include a third pull-down driver 421, a fourth pull-down driver 422, and an NMOS transistor 423. The third pull-down driver 421 may pull down the pull-down voltage terminal A of the first inverter 511 in response to the inverted received signal RECEIVED_SIGNALB and the weight WEIGHT, whereas the fourth pull-down driver 422 may pull down the pull-down voltage terminal B of the second inverter 512 in response to the received signal RECEIVED_SIGNAL and the weight WEIGHT. The NMOS transistor 423 may enable/disable the third and fourth pull-down drivers 421 and 422. The third pull-down driver 421 may include two NMOS transistors 531 and 532 coupled in series to each other, and the fourth pull-down driver 422 may include two NMS transistors 533 and 534 coupled in series to each other.

While the clock CLK_S supplied from the second selector 442 is at a logic L level, the NMOS transistor 423 may be turned off to disable the third and fourth pull-down drivers 421 and 422.

While the clock CLK_S supplied from the second selector 442 is at a logic H level, the NMOS transistor 423 may be turned on to enable the third and fourth pull-down drivers 421 and 422. The third pull-down driver 421 may pull down the same voltage terminal A as the first pull-down driver 513, and the fourth pull-down driver 422 may pull down the same voltage terminal B as the second pull-down driver 514. The NMOS transistor 531 of the third pull-down driver 421 and the NMOS transistor 533 of the fourth pull-down driver 422 may be controlled by the weight WEIGHT. Therefore, the increase of the weight WEIGHT may strengthen the drivability of the third and fourth pull-down drivers 421 and 422, and the decrease of the weight WEIGHT may weaken the drivability of the third and fourth pull-down drivers 421 and 422. In other words, as the weight WEIGHT is increased, the input signal IN_SIGNAL may be compensated for to a greater extent by the inverted received signal RECEIVED_SIGNALB, and the inverted input signal IN_SIGNALB may be compensated for to a greater extent by the received signal RECEIVED_SIGNAL. Furthermore, as the weight WEIGHT is decreased, the input signal N_SIGNAL may be compensated for to a lesser extent by the inverted received signal RECEIVED_SIGNALB, and the inverted input signal IN_SIGNALB may be compensated for to a lesser extent by the received signal RECEIVED_SIGNAL.

Figure 6:
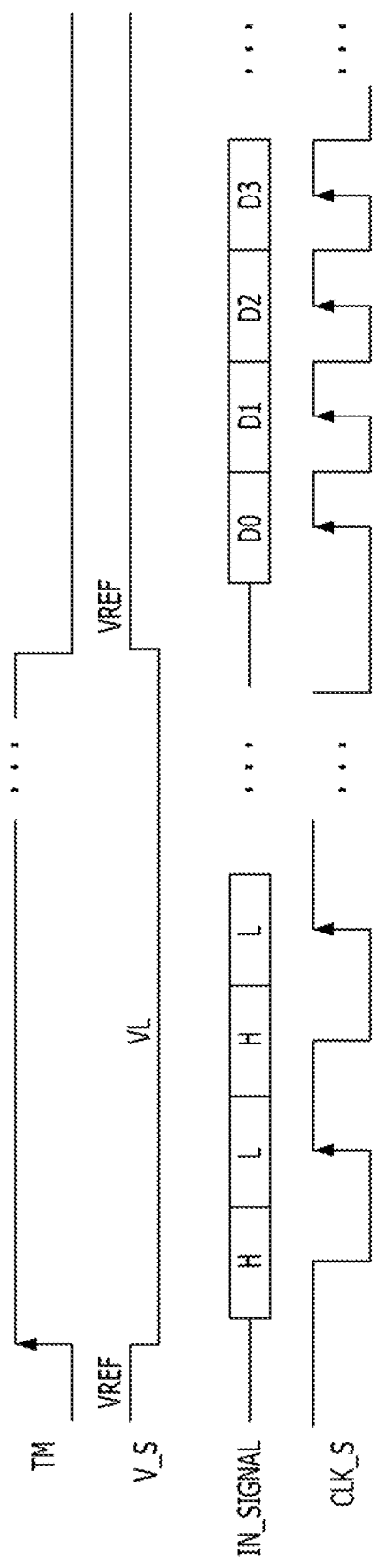
FIG. 6 is a timing diagram illustrating an operation of the signal receiver circuit 400.
Figure 7:
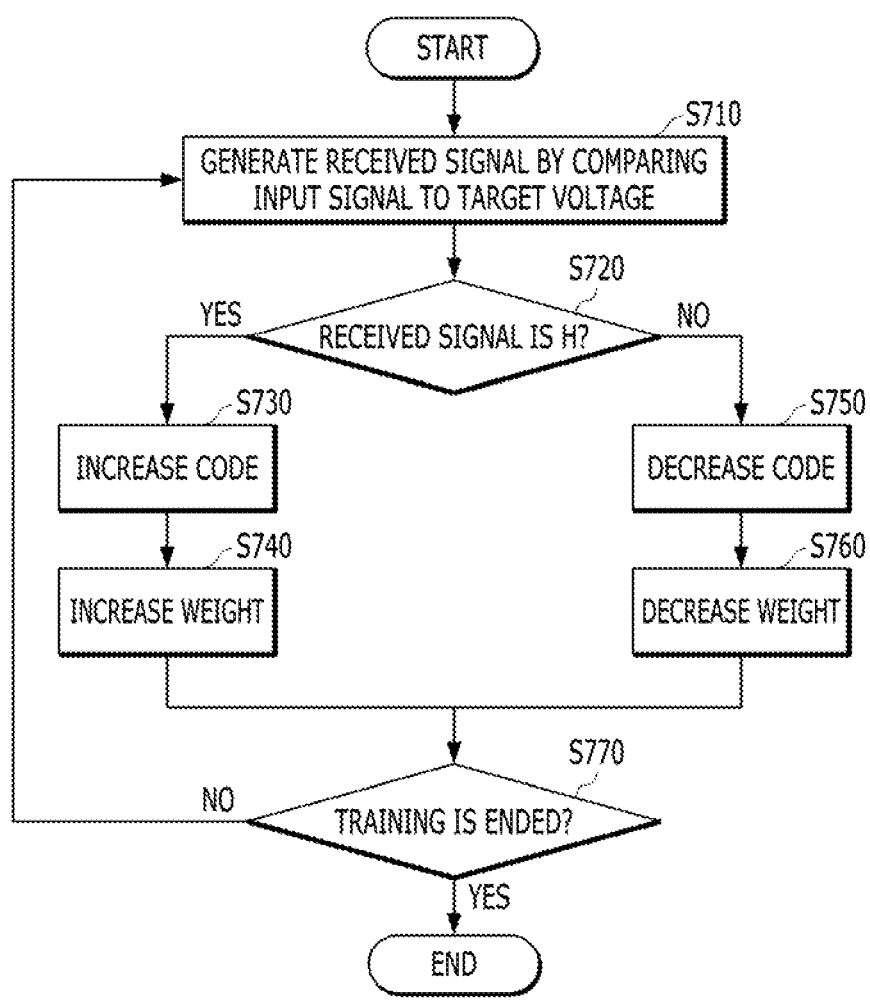
FIG. 7 is a flowchart illustrating a training operation of the signal receiver circuit 400.

FIG. 6 is a timing diagram illustrating the operation of the signal receiver circuit 400, and FIG. 7 is a flowchart illustrating the training operation of the signal receiver circuit 400.

FIG. 6 shows that, during the training operation in which the test mode signal TM is activated to a logic H level, the voltage V_S inputted to the receiver 410 has a level corresponding to the target voltage VL, and the input signal IN_SIGNAL has a pattern of toggling between a logic H level and a logic L level. Furthermore, the clock CLK_S inputted to the receiver 410 which is the training clock TCLK, may have a pattern of controlling the receiver 410 to sample the input signal IN_SIGNAL when the input signal IN_SIGNAL is at a logic L level. That is, the rising edge of the training clock TCLK may be synchronized with the period in which the input signal IN_SIGNAL is at a logic L level.

Referring to FIGS. 6 and 7, during the training operation, the receiver 410 may sample the input signal IN_SIGNAL when the input signal IN_SIGNAL is at a logic L level, compare the sampled signal with the target voltage VL, and generate the received signal RECEIVED_SIGNAL, at step S710. When the voltage level of the received signal RECEIVED_SIGNAL is at a logic H level (Yes at step S720), it may indicate that the compensation degree of the compensator 420 is not enough. Thus, the counter 431 of the weight adjuster 430 may increase the value of the code CODE<0:N> at step S730, and the digital-analog converter 432 may increase the weight WEIGHT at step S740. When the voltage level of the received signal RECEIVED_SIGNAL is at a logic L level (No at step S720), it may indicate that the compensation degree of the compensator 420 is excessive. Thus, the counter 431 of the weight adjuster 430 may decrease the value of the code CODE<0:N> at step S750, and the digital-analog converter 432 may decrease the weight WEIGHT at step S760. This process may be repeatedly performed during the training operation (No at step S770). When the training operation is ended (Yes at step S770), the weight WEIGHT may not be changed but be fixed or held constant at step S780.

FIG. 6 shows that, during the normal operation in which, the test mode signal TM is deactivated to a logic level the voltage V_S inputted to the receiver 410 has a level corresponding to the reference voltage VREF, and data D0 to D3 are inputted as the input signal IN_SIGNAL. The clock CLK_S inputted to the receiver 410, which is the normal clock CLK, may have a pattern of controlling the receiver 410 to sample the data D0 to D3. That is, the data D0 to D3 may be synchronized with rising edges of the normal clock CLK. During the normal operation, the compensator 420 may compensate for the input signal IN_SIGNAL using the weight WEIGHT adjusted by the training operation. Thus, the signal receiver circuit 400 may be operated with high precision.

FIGS. 4 to 7 illustrate that the channel 101 is terminated to a high level. However, the signal receiver circuit 400 described with reference to FIGS. 4 to 7 can be used even when the channel 101 is terminated to a low level. When the channel 101 is terminated to a low level, the signal receiver circuit 400 may be changed as follows. The target voltage inputted to the receiver 410 during the training operation may be changed to VH instead of VL, and the rising edges of the training clock TCLK may have a pattern of controlling the receiver 410 to sample the input signal IN_SIGNAL when the input signal IN_SIGNAL is at a logic H level. Further, the weight adjuster 430 may raise the weight WEIGHT when the received signal RECEIVED_SIGNAL is at a logic L level, and the compensator 420 may be pulled up to compensate for the input signal IN_SIGNAL.

Figure 8:
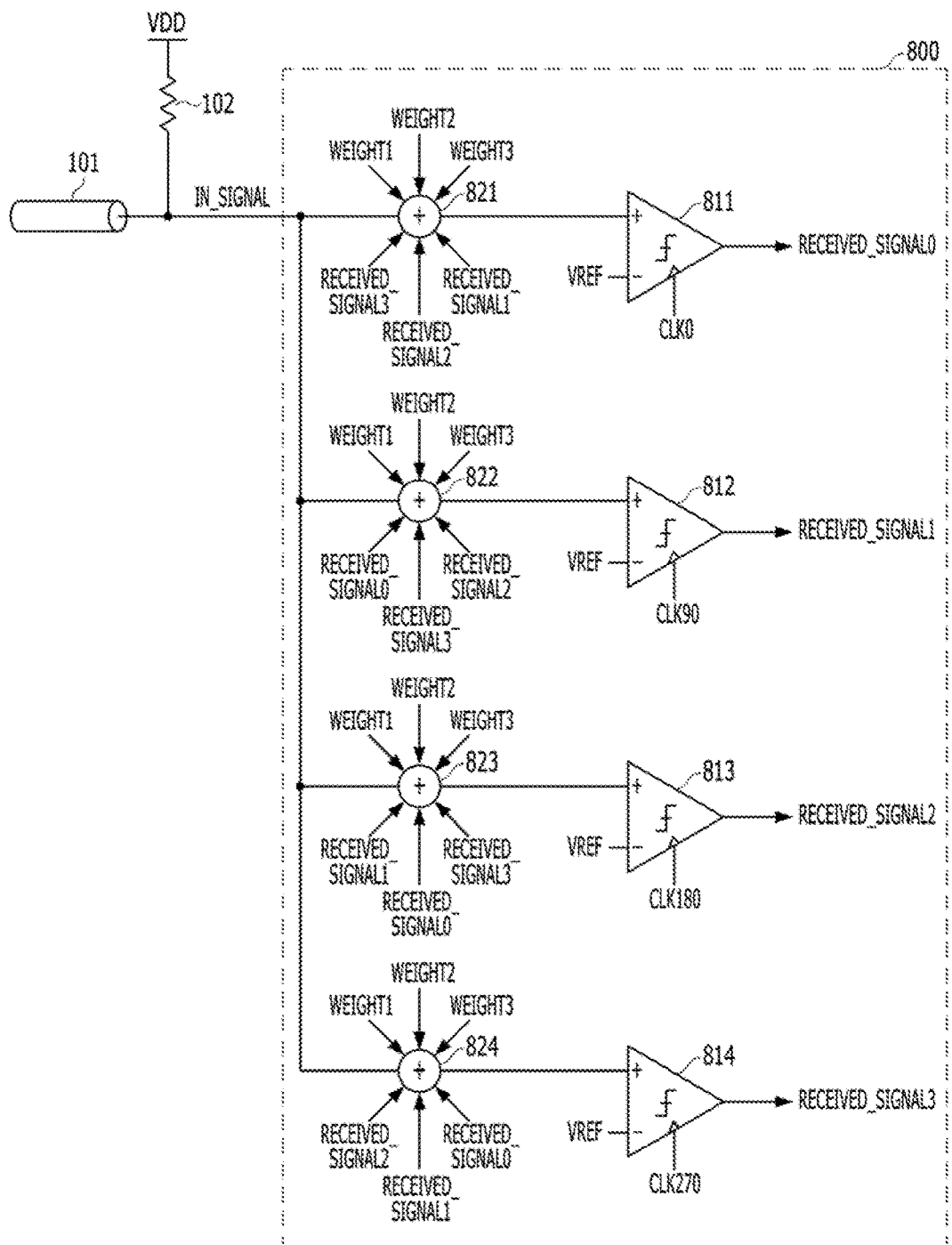
FIG. 8 is a configuration diagram of a signal receiver circuit 800 in accordance with one exemplary embodiment.

FIG. 8 is an exemplary configuration diagram of a signal receiver circuit 800 in accordance with one embodiment. The signal receiver circuit 800 in accordance with one embodiment may use clocks CLK0, CLK90, CLK180, and CLK270 having different phases and perform a multi-tap compensation operation.

Referring to FIG. 8, the signal receiver circuit 800 may include first to fourth receivers 811 to 814 and first to fourth compensators 821 to 824.

The first receiver 811 may operate in synchronization with the first clock CLK0 and receive an input signal IN_SIGNAL synchronized with the first clock CLK0 among input signals IN_SIGNAL transmitted through a channel 101. The first receiver 811 may generate a first received signal RECEIVED_SIGNAL0 by comparing the voltage level of the input signal IN_SIGNAL synchronized with a rising edge of the first clock CLK0 with the voltage level of a reference voltage VREF.

The second receiver 812 may operate in synchronization with the second clock CLK90 and receive an input signal IN_SIGNAL synchronized with the second clock CLK90 among the input signals IN_SIGNAL transmitted through the channel 101. The second receiver 812 may generate a second received signal RECEIVED_SIGNAL1 by comparing the voltage level of the input signal IN_SIGNAL synchronized with a rising edge of the second clock CLK90 with the voltage level of the reference voltage VREF. The second clock CLK0 may have a phase difference of 90 degrees from the first clock CLK0.

The third receiver 813 may operate in synchronization with the third clock CLK180 and receive an input signal IN_SIGNAL synchronized with the third clock CLK180 among the input signals IN_SIGNAL transmitted through the channel 101. The third receiver 813 may generate a third received signal RECEIVED_SIGNAL2 by comparing the voltage level of the input signal IN_SIGNAL synchronized with a rising edge of the third clock CLK180 with the voltage level of the reference voltage VREF. The third clock CLK180 may have a phase difference of 180 degrees from the first clock CLK0.

The fourth receiver 814 may operate in synchronization with the fourth clock CLK270 and receive an input signal IN_SIGNAL synchronized with the fourth clock CLK270 among the input signals IN_SIGNAL transmitted through the channel 101. The fourth receiver 814 may generate a fourth received signal RECEIVED_SIGNAL3 by comparing the voltage level of the input signal IN_SIGNAL synchronized with a rising edge of the fourth clock CLK270 with the voltage level of the reference voltage VREF. The fourth clock CLK270 may have a phase difference of 270 degrees from the first clock CLK0.

Figure 9:
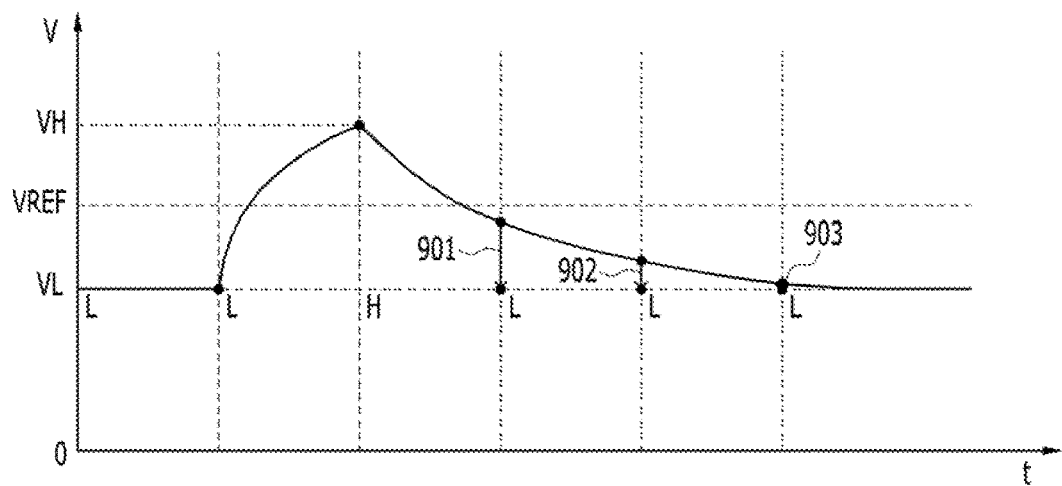
FIG. 9 illustrates a voltage level of the channel 101 when logic L, L, H, L, L, and L signals are transmitted to the channel 101.

Each of the first to fourth comparators 821 to 824 may perform a multi-tap compensation operation. FIG. 9 illustrates the voltage levels of the channel 101 when logic L, L, H, L, L, and L signals are transmitted to the channel 101. FIG. 9 shows that, when long-tail inter-symbol interference (ISI) is present, the logic L signal at three taps after the logic H level as well as the logic L signal at one tap after the logic H level does not have a level corresponding to the target value VL. In FIG. 9, an arrow 910 may indicate a value which needs to be compensated for with respect to a signal transition before one tap, an arrow 920 may indicate a value which needs to be compensated for with respect to a signal transition before two taps, and an arrow 930 may indicate a value which needs to be compensated for with respect to a signal transition before three taps. Each of the first to fourth comparators 821 to 824 may perform a multi-tap compensation operation ranging from one tap to three taps.

The first compensator 821 may apply a first weight WEIGHT1 to the fourth received signal RECEIVED_SIGNAL3, apply a second weight WEIGHT2 to the third received signal RECEIVED_SIGNAL2, and apply a third weight WEIGHT3 to the second received signal RECEIVED_SIGNAL1, in order to compensate for the receiving operation of the first receiver 811. The first weight WEIGHT1 may indicate a weight for a one-tap compensation operation, and the second weight WEIGHT2 may indicate a weight for a two-tap compensation operation, while the third weight WEIGHT3 may indicate a weight for a three-tap compensation operation. Since the strengths of the compensation operations have a relation of (one-tap compensation operation>two-tap compensation operation>three-tap compensation operation), the weights may have a relation of (first weight WEIGHT1>second weight WEIGHT2>third weight WEIGHT3).

The second compensator 822 may apply the first weight WEIGHT1 to the first received signal RECEIVED_SIGNAL0, apply the second weight WEIGHT2 to the fourth received signal RECEIVED_SIGNAL3, and apply the third weight WEIGHT3 to the third received signal RECEIVED_SIGNAL2, in order to compensate for the receiving operation of the second receiver 812.

The third compensator 823 may apply the first weight WEIGHT1 to the second received signal RECEIVED_SIGNAL1, apply the second weight WEIGHT2 to the first received signal RECEIVED_SIGNAL0, and apply the third weight WEIGHT3 to the fourth received signal RECEIVED_SIGNAL3, in order to compensate for the receiving operation of the third receiver 813.

The fourth compensator 824 may apply the first weight WEIGHT1 to the third received signal RECEIVED_SIGNAL2, apply the second weight WEIGHT2 to the second received signal RECEIVED_SIGNAL1, and apply the third weight WEIGHT3 to the first received signal RECEIVED_SIGNAL0, in order to compensate for the receiving operation of the fourth receiver 814.

Since each of the compensators 821 to 824 performs a multi-tap compensation operation, the weights WEIGHT1 to WEIGHT3 need to be correctly adjusted for the precise compensation operations of the compensators 821 to 824.

Figure 10:
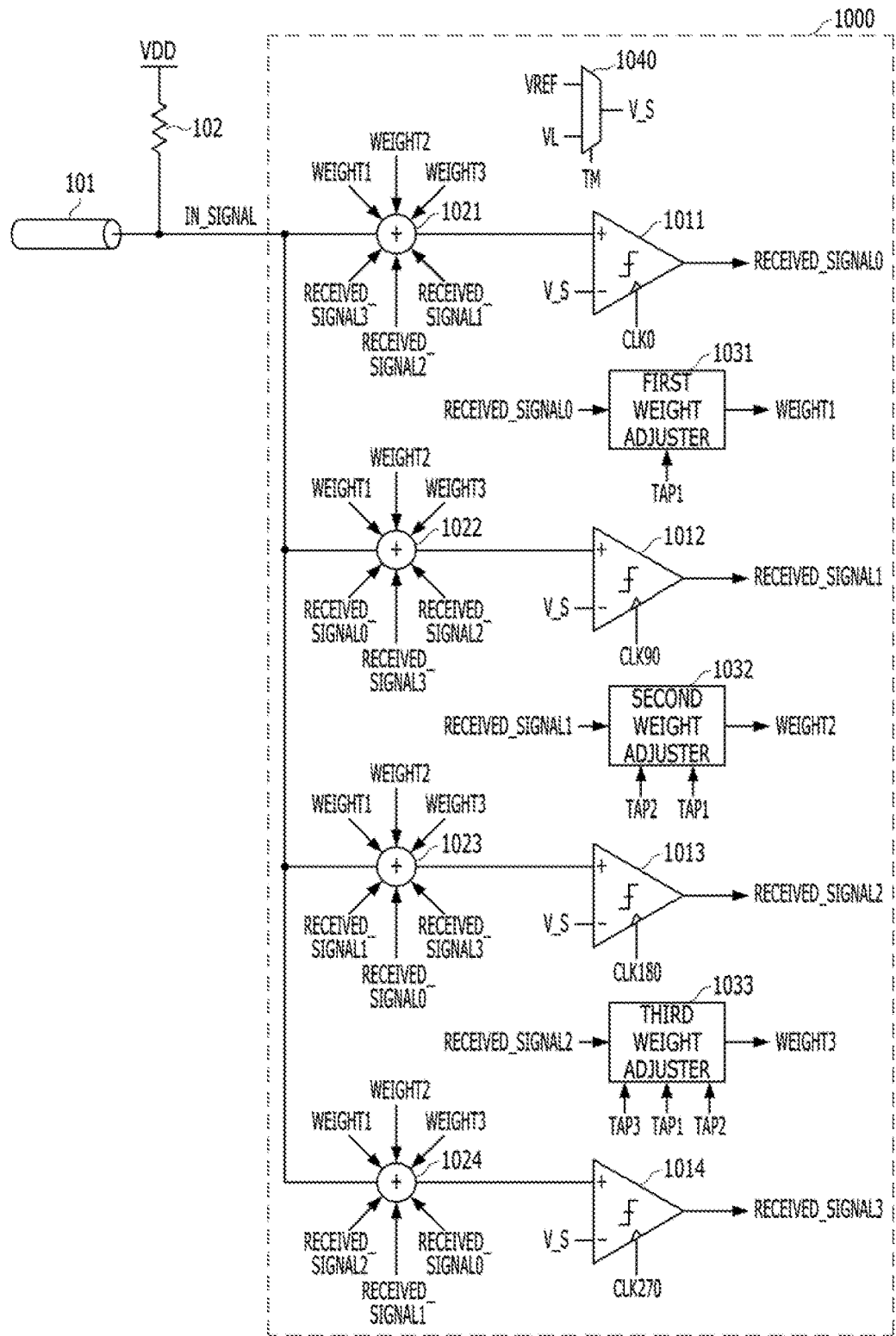
FIG. 10 is a configuration diagram of a signal receiver circuit 1000 in accordance with one exemplary embodiment.

FIG. 10 is a configuration diagram of a signal receiver circuit 1000 in accordance with one embodiment. The signal receiver circuit 1000 in accordance with one embodiment may further include units for training the weights WEIGHT1 to WEIGHT3 to the optimal values, when compared to the signal receiver circuit 800 shown in FIG. 8 in accordance with one embodiment.

Referring to FIG. 10, the signal receiver circuit 1000 may include first to fourth receivers 1011 to 1014, first to fourth compensators 1021 to 1024, first to third weight adjusters 1031 to 1033, and a selector 1040.

The selector 1040 may select a voltage V_S that the first to fourth receivers 1011 to 1014 will compare with the input signals IN_SIGNAL, and transmit the selected voltage to the first to fourth receivers 1011 to 1014. The selector 1040 may select the reference voltage VREF and transmit the selected voltage to the first to fourth receivers 1011 to 1014 during the normal operation, and select the target voltage VL and transmit the selected voltage to the first to fourth receivers 1011 to 1014 during the training operation. The target voltage VL may correspond to the target value of a voltage that the input signal IN_SIGNAL needs to have for a logic L level. The selector 1040 may distinguish between the normal operation and the training operation using the test mode signal TM. The test mode signal TM may be activated during the training operation for adjusting the weights WEIGHT1 to WEIGHT3 and deactivated during the normal operation.

The first receiver 1011 may operate in synchronization with the first clock CLK0 and receive an input signal IN_SIGNAL synchronized with the first clock CLK0 among the input signals IN_SIGNAL transmitted through the channel 101. The first receiver 1011 may generate a first received signal RECEIVED_SIGNAL0 by comparing the voltage level of the input signal IN_SIGNAL synchronized with a rising edge of the first clock CLK0 with the voltage level of the voltage V_S selected by the selector 1040.

The second receiver 1012 may operate in synchronization with the second clock CLK90 and receive an input signal IN_SIGNAL synchronized with the second clock CLK90 among the input signals IN_SIGNAL transmitted through the channel 101. The second receiver 1012 may generate a second received signal RECEIVED_SIGNAL1 by comparing the voltage level of the input signal IN_SIGNAL synchronized with a rising edge of the second clock CLK90 with the voltage level of the voltage V_S selected by the selector 1040.

The third receiver 1013 may operate in synchronization with the third clock CLK180 and receive an input signal IN_SIGNAL synchronized with the third clock CLK180 among the input signals IN_SIGNAL transmitted through the channel 101. The third receiver 1013 may generate a third received signal RECEIVED_SIGNAL2 by comparing the voltage level of the input signal IN_SIGNAL synchronized with a rising edge of the third clock CLK180 with the voltage level of the voltage V_S selected by the selector 1040.

The fourth receiver 1014 may operate in synchronization with the fourth clock CLK270 and receive an input signal IN_SIGNAL synchronized with the fourth clock CLK270 among the input signals IN_SIGNAL transmitted through the channel 101. The fourth receiver 1014 may generate a fourth received signal RECEIVED_SIGNAL3 by comparing the voltage level of the input signal IN_SIGNAL synchronized with a rising edge of the fourth clock CLK270 with the voltage level of the voltage selected by the selector 1040.

The first weight adjuster 1031 may adjust the first weight WEIGHT1 in response to the first received signal RECEIVED_SIGNAL0. The first weight adjuster 1031 may be enabled in, response to a first weight adjustment signal TAP1. The first weight adjuster 1031 may adjust the first weight WEIGHT1 according to the value of the first received signal RECEIVED_SIGNAL1 when the first weight adjustment signal TAP1 is activated, and fix or hold constant the first weight WEIGHT1 when the first weight adjustment signal TAP1 is deactivated.

The second weight adjuster 1032 may adjust the second weight WEIGHT2 in response to the second received signal RECEIVED_SIGNAL1. The second weight adjuster 1032 may be enabled in response to a second weight adjustment signal TAP2. The second weight adjuster 1032 may adjust the second weight WEIGHT2 according to the value of the second received signal RECEIVED_SIGNAL1 when the second weight adjustment signal TAP2 is activated, and fix or hold constant the second weight WEIGHT2 when the second weight adjustment signal TAP2 is deactivated. When the first weight adjustment signal TAP1 is activated, the second weight WEIGHT2 may be adjusted to 0.

The third weight adjuster 1033 ay adjust the third weight WEIGHT3 in response to the third received signal RECEIVED_SIGNAL2. The third weight adjuster 1033 may be enabled in response to a third weight adjustment signal TAP3. The third weight adjuster 1033 may adjust the third weight WEIGHT3 according to the value of the third received signal RECEIVED_SIGNAL2 when the third weight adjustment signal TAP3 is activated, and fix or hold constant the third weight WEIGHT3 when the third weight adjustment signal TAP3 is deactivated. When at least one of the first and second weight adjustment signals TAP1 and TAP2 is activated, the third weight WEIGHT3 may be adjusted to 0.

The first compensator 1021 may apply the first weight WEIGHT1 to the fourth received signal RECEIVED_SIGNAL3, apply the second weight WEIGHT2 to the third received signal RECEIVED_SIGNAL2, and apply the third weight WEIGHT3 to the second received signal RECEIVED_SIGNAL1, in order to compensate for the receiving operation of the first receiver 1011. The first weight WEIGHT1 may indicate a weight for a one-tap compensation operation, and the second weight WEIGHT2 may indicate a weight for a two-tap compensation operation, while the third weight WEIGHT3 may indicate a weight for a three-tap compensation operation. Since the strengths of the compensation operations have a relation of (one-tap compensation operation>two-tap compensation operation>three-tap compensation operation), the weights may have a relation of (first weight WEIGHT1>second weight WEIGHT2>third weight WEIGHT3).

The second compensator 1022 may apply the first weight WEIGHT1 to the first received signal RECEIVED_SIGNAL0, apply the second weight WEIGHT2 to the fourth received signal RECEIVED_SIGNAL3, and apply the third weight WEIGHT3 to the third received signal RECEIVED_SIGNAL2 in order to compensate for the receiving operation of the second receiver 1012.

The third compensator 1023 may apply the first weight WEIGHT1 to the second received signal RECEIVED_SIGNAL1, apply the second weight WEIGHT2 to the first received signal RECEIVED_SIGNAL0, and apply the third weight WEIGHT3 to the fourth received signal RECEIVED_SIGNAL3, in order to compensate for the receiving operation of the third receiver 1013.

The fourth compensator 1024 may apply the first weight WEIGHT1 to the third received signal RECEIVED_SIGNAL2, apply the second weight WEIGHT2 to the second received signal RECEIVED_SIGNAL1, and apply the third weight WEIGHT3 to the first received signal RECEIVED_SIGNAL0 in order to compensate for the receiving operation of the fourth receiver 1014.

Figure 11:
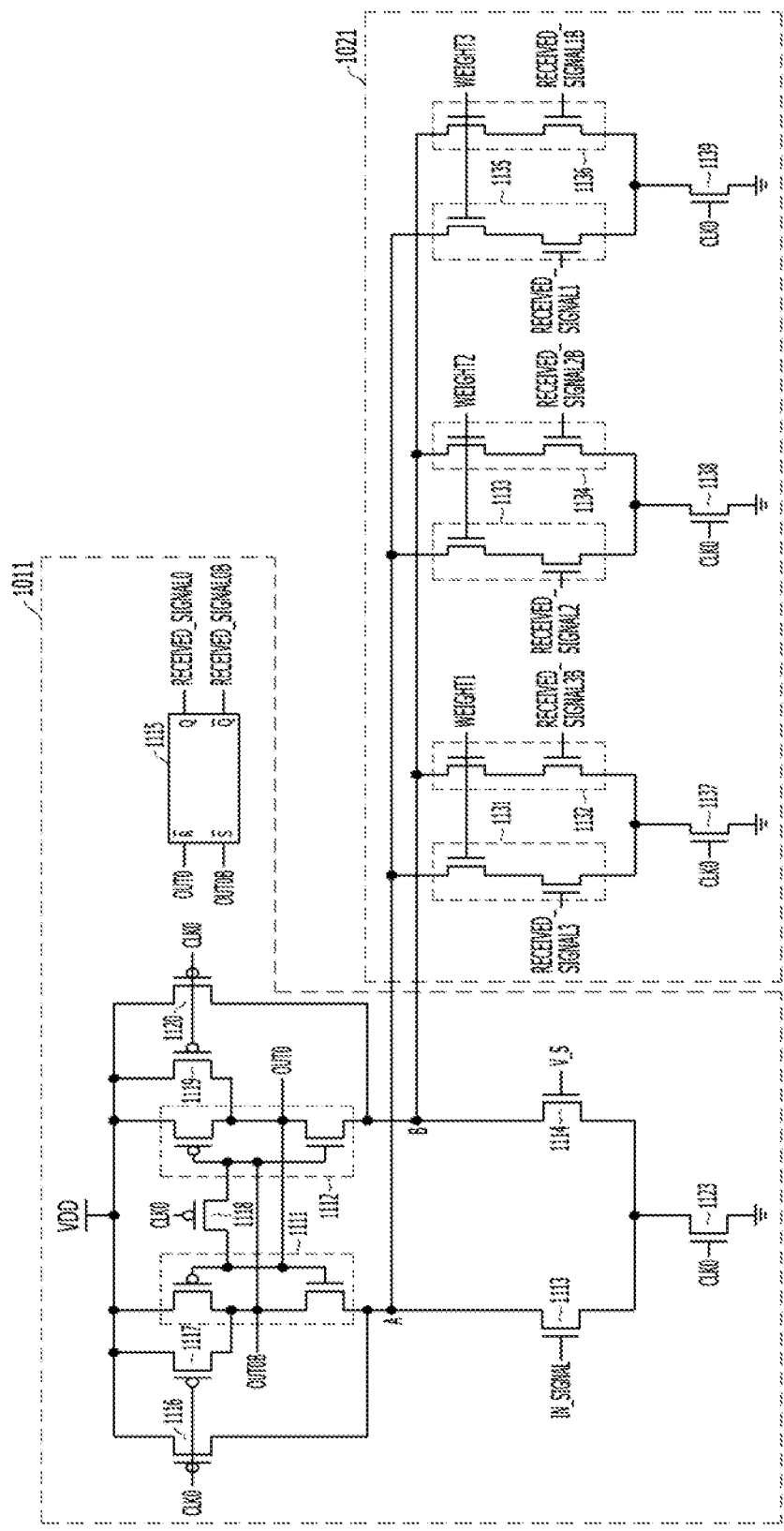
FIG. 11 is an exemplary configuration diagram of a first receiver 1011 and a first compensator 1021 of FIG. 10.

FIG. 11 is an exemplary circuit diagram of the first receiver 1011 and the first compensator 1021 in FIG. 10.

Referring to FIG. 11, the receiver 11 may include first and second inverters 1111 and 1112, a first pull-down driver 1113, a second pull-down driver 1114, a latch circuit 1115, PMOS transistors 1116 to 1120, and an NMOS transistor 1123. The first and second inverters 1111 and 1112 may be cross-coupled to each other. Also, the first pull-down driver 1113 may pull down a pull-down voltage terminal A of the first inverter 1111 in response to the input signal IN_SIGNAL and the second pull-down driver 1114 may pull down a pull-down voltage terminal B of the second inverter 1112 in response to the voltage V_S supplied from the selector 1040. The latch circuit 1115 may latch a first output signal OUT0 outputted from an output terminal of the second inverter 1112 and an inverted first output signal OUT0B outputted from an output terminal of the first inverter 1111, and provide the latched signals as the first received signal RECEIVED_SIGNAL0 and the inverted first received signal RECEIVED_SIGNAL0B. The PMOS transistors 1116 to 1120 may reset the first output signal OUT0 and the inverted first output signal OUT0B in response to the first clock CLK0, and the NMOS transistor 1123 may enable/disable the first and second pull-down drivers 1113 and 1114 in response to the first clock CLK0. Each of the first and second pull-down drivers 1113 and 1114 may include an NMOS transistor, and the latch circuit 1115 may include an SR NAND latch.

While the first clock CLK0 is at a logic L level, the NMOS transistor 1123 may be turned off to disable the first and second pull-down drivers 1113 and 1114. The PMOS transistors 1116 and 1120 may be turned on to reset the first output signal OUT0 and the inverted first output signal OUT0B to a logic H level. At this time, the first received signal RECEIVED_SIGNAL0 and the inverted first received signal RECEIVED_SIGNAL0B which are outputted from the latch circuit 1115 may retain the previous values.

While the first clock CLK0 is at a logic H level the NMOS transistor 1123 may be turned on to enable the first and second pull-down drivers 1113 and 1114. The PMOS transistors 1116 to 1120 may be turned off. When the voltage level of the input signal IN_SIGNAL is higher than the level of the voltage V_S, the first pull-down driver 1113 may be turned to a greater extent than the second pull-down driver 1114. Thus, the voltage level of the pull-down voltage terminal A of the first inverter 1111 may become lower than the voltage level of the pull-down voltage terminal B of the second inverter 1112. The first and second inverters 1111 and 1112 may amplify a voltage level difference between the voltage terminals A and B. As a result, the first output signal OUT0 may be outputted at a logic H level, and the inverted first output signal OUT0B may be outputted at a logic L level. Further, the first received signal RECEIVED_SIGNAL outputted from the latch circuit 1115 may have a logic H level, and the inverted first received signal RECEIVED_SIGNAL0B outputted from the latch circuit 1115 may have a logic L level. On the other hand, when the voltage level of the input signal IN_SIGNAL is lower than the level of the voltage V_S, the second pull-down driver 1114 may be turned on to a greater extent than the first pull-down driver 1113. Thus, the voltage level of the pull-down voltage terminal A of the first inverter 1111 may become higher than the voltage level of the pull-down voltage terminal B of the second inverter 1112. The first and second inverters 1111 and 1112 may amplify the voltage level difference between the voltage terminals A and B. As a result, the first output signal OUT0 may be outputted at a logic L level, and the inverted first output signal OUT0B may be outputted at a logic H level. Further, the first received signal RECEIVED_SIGNAL0 outputted from the latch circuit 1115 may have a logic L level, and the inverted first received signal RECEIVED_SIGNAL0B outputted from the latch circuit 1115 may have a logic H level.

The first compensator 1021 may include third to eighth pull-down drivers 1131 to 1136 and NMOS transistors 1137 to 1139. The third pull-down driver 1131 may pull down the pull-down voltage terminal A of the first inverter 1111 in response to the inverted fourth received signal RECEIVED_SIGNAL3B and the first weight WEIGHT1, and the fourth pull-down driver 1132 may pull down the pull-down voltage terminal B of the second inverter 1112 in response to the fourth received signal RECEIVED_SIGNAL3 and the first weight WEIGHT1. Further, the fifth pull-down driver 1133 may pull down the pull-down voltage terminal A of the first inverter 1111 in response to the inverted third received signal RECEIVED_SIGNAL2B and the second weight WEIGHT2, and the sixth pull-down driver 1134 may pull down the pull-down voltage terminal B of the second inverter 1112 in response to the third received signal RECEIVED_SIGNAL2 and the second weight WEIGHT2. The seventh pull-down driver 1135 may pull down the pull-down voltage terminal A of the first inverter 1111 in response to the inverted second received signal RECEIVED_SIGNAL1B and the third weight WEIGHT3, and the eighth pull-down driver 1136 may pull down the pull-down voltage terminal B of the second inverter 1112 in response to the second received signal RECEIVED_SIGNAL1 and the third weight WEIGHT3. The NMOS transistors 1137 to 1139 may enable/disable the third to eighth pull-down drivers 1131 to 1136. Each of the third to eighth pull-down drivers 1131 to 1136 may include two NMOS transistors coupled in series to each other.

While the first clock CLK0 is at a logic L level, the NMOS transistors 1137 to 1139 may be turned off to disable the third to eighth pull-down drivers 1131 to 1136.

While the first clock CLK0 is at a logic H level, the NMOS transistors 1137 to 1139 may be turned on to enable the third to eighth pull-down drivers 1131 to 1136. The third and fourth pull-down drivers 1131 and 1132 may perform a one-tap compensation operation, and the strength of the compensation operation may be decided by the first weight WEIGHT1. The fifth and sixth pull-down drivers 1133 and 1134 may perform a two-tap compensation operation, and the strength of the compensation operation may be decided by the second weight WEIGHT2. The seventh and eighth pull-down drivers 1135 and 1136 may perform a three-tap compensation operation, and the strength of the compensation operation may be decided by the third weight WEIGHT3. The first compensator 1021 may operate in the same manner as the compensator 420 shown in FIG. 5, except that the first compensator 1021 performs a multi-tap compensation operation.

FIG. 11 illustrates exemplary configurations of the first receiver 1011 and the first compensator 1021. However, the second to fourth receivers 1012 to 1014 may be configured in the same manner as the first receiver 1011, and the second and third compensators 1022 and 1023 may be configured in the same manner as the first compensator 1021.

Figure 12:
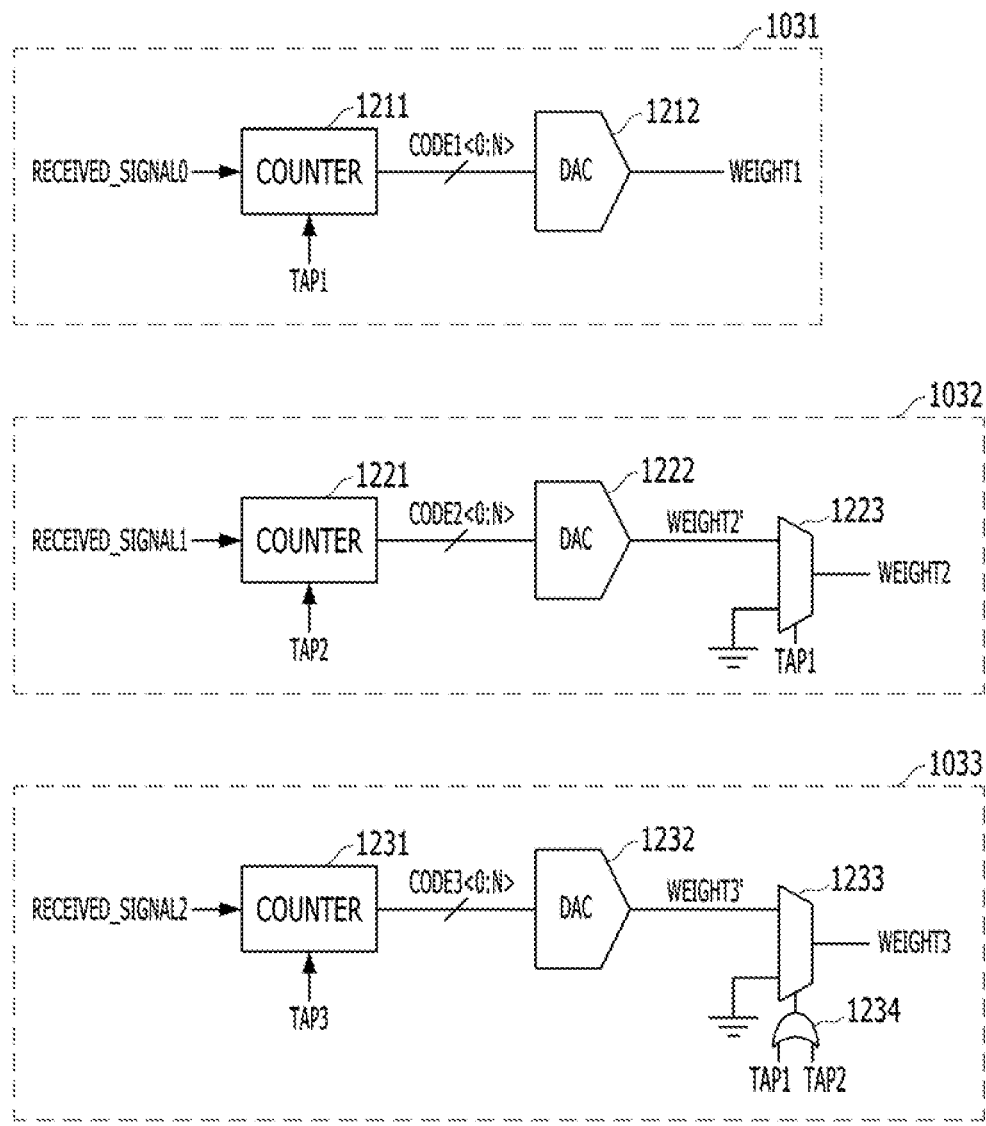
FIG. 12 is an exemplary configuration diagram of first to third weight adjusters 1031 to 1033 of FIG. 10.

FIG. 12 is an exemplary circuit diagram of the first to third weight adjusters 1031 to 1033 of FIG. 10.

Referring to FIG. 12, the first weight adjuster 1031 may include a first counter 1211 and a first digital-analog converter 1212. The first counter 1211 may increase/decrease the value of a first code CODE1<0:N> in response to the first received signal RECEIVED_SIGNAL0. Specifically, the first counter 1211 may increase the first code CODE1<0:N> when the first received signal RECEIVED_SIGNAL0 is at a logic H level and decrease the first code CODE1<0:N> when the first received signal RECEIVED_SIGNAL0 is at a logic L level. The first counter 1211 may be enabled when the first weight adjustment signal TAP1 is activated, and fix or hold constant the value of the first code CODE1<0:N> when the first weight adjustment signal TAP1 is deactivated. The first digital analog converter 1212 may convert the first code CODE1<0:N> into the first weight WEIGHT1 corresponding to an analog voltage. The first digital-analog converter 1212 may raise the level of the first weight voltage WEIGHT1 as the first code CODE1<0:N> has a larger value, and lower the level of the first weight voltage WEIGHT1 as the first code CODE1<0:N> has a smaller value.

The second weight adjuster 1032 may include a second counter 1221, a second digital-analog converter 1222, and a second selector 1223. The second counter 1221 may increase/decrease the value of a second code CODE2<0:N> in response to the second received signal RECEIVED_SIGNAL1. Specifically, the second counter 1221 may increase the second code CODE2<0:N> when the second received signal RECEIVED_SIGNAL1 is at a logic H level, and decrease the second code CODE2<0:N> when the second received signal RECEIVED_SIGNAL1 is at a logic L level. The second counter 1221 may be enabled when the second weight adjustment signal TAP is activated, and fix or hold constant the value of the second code CODE2<0:N> when the second weight adjustment signal TAP2 is deactivated. The second digital-analog converter 1222 may convert the second code CODE2<0:N> into a preliminary second weight WEIGHT2' corresponding to an analog voltage. The second digital-analog converter 1222 may raise the level of the preliminary second weight voltage WEIGHT2' as the first code CODE1<0:N> has a larger value, and lower the level of the preliminary second weight voltage WEIGHT2' as the first code CODE1<0:N> has a smaller value. The second selector 1223 may output the preliminary second weight WEIGHT2' as the second weight WEIGHT2 when the first weight adjustment signal TAP1 is deactivated, and output the ground voltage as the second weight WEIGHT2 when the first weight adjustment signal TAP1 is activated. This is in order to correctly adjust the first weight WEIGHT1 by setting the second weight WEIGHT2 to 0 while the first weight adjustment signal TAP1 is activated (i.e., while the first weight WEIGHT1 is adjusted).

The third weight adjuster 1033 may include a third counter 1231, a third digital-analog converter 1232, a third selector 1233, and an OR gate 1234. The third counter 1231 may increase/decrease the value of a third code CODE3<0:N> in response to the third received signal RECEIVED_SIGNAL2. Specifically, the third counter 1231 may increase the third code CODE3<0:N> when the third received signal RECEIVED_SIGNAL2 is at a logic H level, and decrease the third code CODE3<0:N> when the third received signal RECEIVED_SIGNAL2 is at a logic L level. The third counter 1231 may be enabled when the third weight adjustment signal TAP3 is activated, and fix or hold constant the value of the third code CODE3<0:N> when the third weight adjustment signal TAP3 is deactivated. The third digital-analog converter 1232 may convert the third code CODE3<0:N> into a preliminary third weight WEIGHT3' corresponding to an analog voltage. The third digital-analog converter 1232 may raise the level of the preliminary third weight voltage WEIGHT2' as the third code CODE3<0:N> has a larger value, and lower the level of the preliminary third weight voltage WEIGHT3' as the third code CODE3<0:N> has a smaller value. When the first and second weight adjustment signals TAP1 and TAP2 are deactivated (e.g., when the output of the OR gate 1234 corresponds to a logic L level) the third selector 1233 may output the preliminary third weight WEIGHT3' as the third weight WEIGHT3. Then, when at least one of the first and second weight adjustment signals TAP1 and TAP2 is activated (e.g., when the output of the OR gate 1234 corresponds to a logic H level), the third selector 1233 may output the ground voltage as the third weight WEIGHT3. This is in order to correctly adjust the first or second weight WEIGHT1 or WEIGHT2 by setting the third weight WEIGHT3 to 0 while the first or second weight WEIGHT1 or WEIGHT2 is adjusted.

Figure 13:
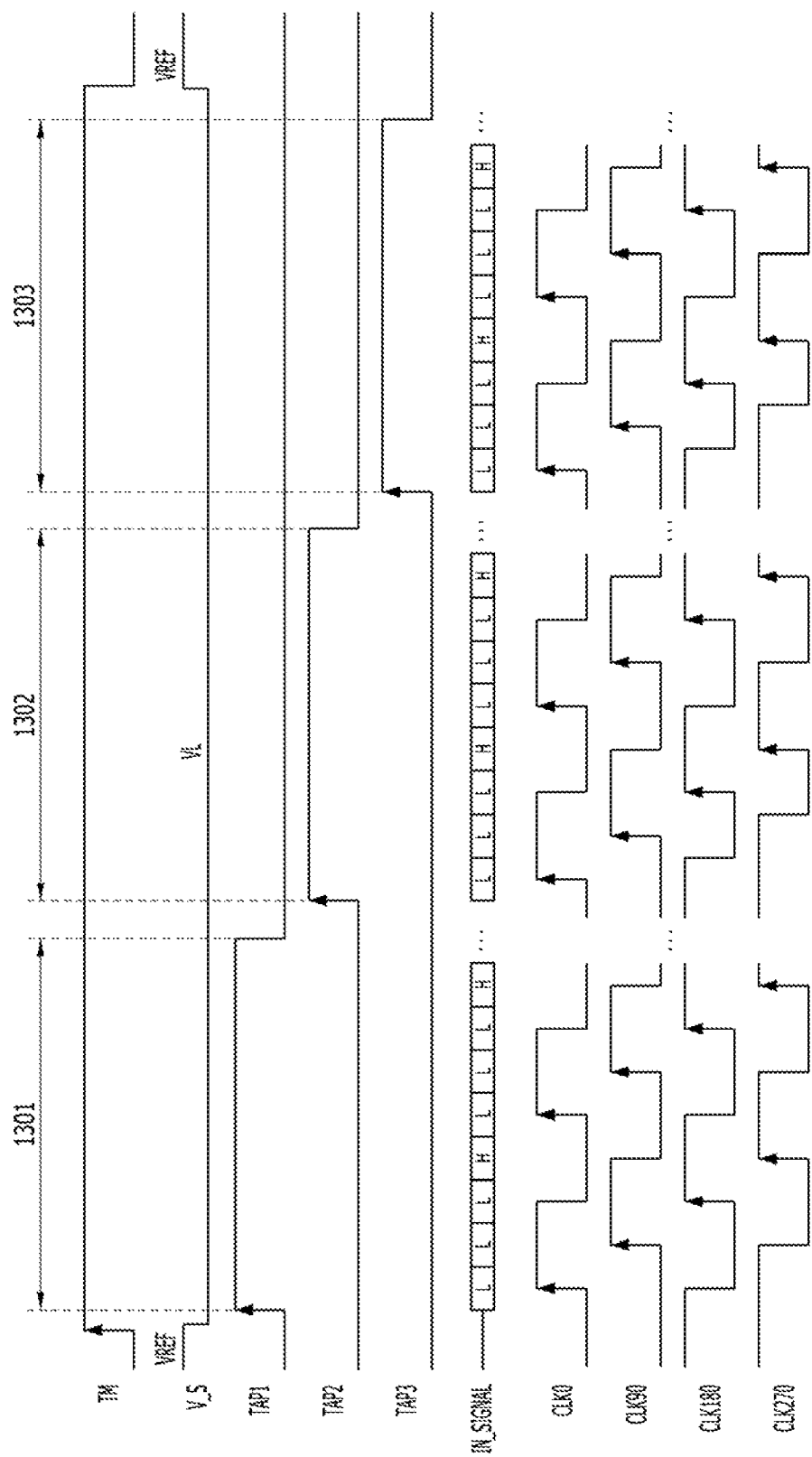
FIG. 13 is a timing diagram illustrating a training operation of the signal receiver circuit 1000.

FIG. 13 timing diagram illustrating the training operation of the signal receiver circuit 1000.

FIG. 13 shows that, during the training operation in which the test mode signal TM is activated to a logic H level, the voltage V_S inputted to the first to fourth receivers 1011 to 1014 has a level corresponding to the target voltage VL, and the input signal IN_SIGNAL has a logic L level at rising edges of the first to third clocks CLK0, CLK90, and CLK180 and has a logic H level at a rising edge of the fourth clock CLK270. That is, during the training operation the input signal IN_SIGNAL may have a pattern in which logic L, L, L, and H levels are repeated.

During a period 1301 in which the first weight adjustment signal TAP1 is activated, the second and third weights WEIGHT2 and WEIGHT3 may be retained at 0. The first weight adjuster 1031 may adjust the first weight WEIGHT1 in response to the first received signal RECEIVED_SIGNAL0. When the first weight adjustment signal TAP1 is deactivated and the period 1301 is ended, the first weight WEIGHT1 may be fixed or held constant to the value adjusted during the period 1301.

During a period 1302 in which the second weight adjustment signal TAP2 is activated, the first weight WEIGHT1 may retain the value adjusted during the period 1301, and the third weight WEIGHT3 may be retained at 0. The second weight adjuster 1032 may adjust the second weight WEIGHT2 in response to the second received signal RECEIVED_SIGNAL1. When the second weight adjustment signal TAP2 is deactivated and the period 1302 is ended, the second weight WEIGHT2 may be fixed or held constant to the value adjusted during the period 1302.

During a period 1303 in which the third weight adjustment signal TAP3 is activated, the first and second weights WEIGHT1 and WEIGHT2 may be retained at the values adjusted during the previous periods. The third weight adjuster 1033 may adjust the third weight WEIGHT3 in response to the third received signal RECEIVED_SIGNAL2. When the third eight adjustment signal TAP3 is deactivated and the period 1303 is ended, the third weight WEIGHT3 may be fixed to the value adjusted during the period 1303.

After the first to third weights WEIGHT1 to WEIGHT3 are all adjusted, the test mode signal TM may be deactivated to a logic L level, and the level of the voltage V_S inputted to the first to fourth receivers 1011 to 1014 may be changed to the level of the reference voltage VREF. Thus, the normal operations of receiving the input signal IN_SIGNAL through the first to fourth receivers 1011 to 1014 may be performed.

FIG. 13 illustrates that the second weight WEIGHT2 is adjusted after the first weight WEIGHT1 is adjusted, and the third weight WEIGHT3 is adjusted after the second weight WEIGHT2. However, the first to third weights WEIGHT1 to WEIGHT3 may be adjusted at the same time.

FIGS. 10 to 13 illustrate that the channel 101 is terminated to a high level. However, the signal receiver circuit 1000 described with reference to FIGS. 9 to 13 may be used when the channel 101 is terminated to a low level as well. When the channel 101 is terminated to a low level, the signal receiver circuit 1000 may be changed as follows. The target voltage inputted to the first to fourth receivers 1011 to 1014 may be changed to VL from VH, and the input signal IN_SIGNAL may have a pattern of logic H, H, H, and L levels during the training operation. Further, the first to third weight adjusters 1031 to 1033 may raise the first to third weights WEIGHT1 to WEIGHT3 when the first to third received signals RECEIVED_SIGNAL0 to RECEIVED_SIGNAL2 are at a logic L level, and the first to fourth compensators 1021 to 1024 may be pulled up to compensate for the input signal IN_SIGNAL.

In accordance with exemplary embodiments, the signal receiver circuit is capable of correctly compensating for a distortion caused by ISI.

Although various embodiments have been described for illustrative purposes, it will be apparent to those skilled in the art that various changes and modifications may be made without departing from the spirit and scope of the invention as defined in the following claims.

What is claimed is:

1. A signal receiver circuit comprising:
a receiver suitable for generating a received signal based on comparison of an input signal with a reference voltage during a normal operation and based on comparison of the input signal with a target voltage having a target level for the input signal to be at a logic low level during a training operation;
a compensator suitable for applying a weight to the received signal to compensate for the input signal; and
a weight adjuster suitable for increasing the weight when the received signal is at a logic high level and decreasing the weight when the received signal is at the logic low level during the training operation,
wherein during the training operation, the input signal toggles between the logic low level and the logic high level, and the receiver is enabled when the input signal is at the logic low level.

2. The signal receiver circuit of claim 1, further comprising a first selector suitable for providing the reference voltage to the receiver during the normal operation and providing the target voltage to the receiver during the training operation.

3. The signal receiver circuit of claim 2, further comprising a second selector suitable for providing a normal clock for sampling the input signal as a first enable signal of the receiver during the normal operation and for providing a training clock for sampling the input signal as a second enable signal of the receiver when the input signal is at the logic low level during the training operation.

4. The signal receiver circuit of claim 3, wherein the received signal retains a previous value when the receiver is disabled.

5. The signal receiver circuit of claim 1, wherein the weight adjuster comprises:

a counter suitable for increasing or decreasing the value of a weight code based on a level of the received signal; and
a digital-analog converter suitable for generating a weight voltage corresponding to the value of the weight code.

6. The signal receiver circuit of claim 5, wherein the receiver comprises:
first and second inverters cross-coupled to each other;
a first pull-down driver suitable for pulling down a pull-down voltage terminal of the first inverter in response to the input signal;
a second pull-down driver suitable for pulling down a pull-down voltage terminal of the second inverter based on the reference voltage during the normal operation and pulling down the pull-down voltage terminal of the second inverter based on the target voltage during the training operation; and
a latch circuit suitable for latching an output signal from the second inverter and an inverted output signal from the first inverter and providing the latched signals as the received signal and an inverted received signal,
wherein input/output terminals of the first inverter and input/output terminals of the second inverter are reset during a period in which a clock supplied to the receiver is deactivated, and
the first and second pull-down drivers are enabled during a period in which the clock supplied to the receiver is enabled.

7. The signal receiver circuit of claim 6, wherein the compensator comprises:
a third pull-down driver suitable for pulling down the pull-down voltage terminal of the first inverter in response to the inverted received signal and the weight voltage; and
a fourth pull-down driver suitable for pulling down the pull-down voltage terminal of the second inverter in response to the received signal and the weight voltage,
wherein the third and fourth pull-down drivers are enabled during a period in which the clock supplied to the receiver is activated.

8. A signal receiver circuit comprising:
a receiver suitable for generating a received signal based on comparison of an input signal with a reference voltage during a normal operation and based on comparison of the input signal with a target voltage having a target level for the input signal to be at a logic high level during a training operation;
a compensator suitable for applying a weight to the received signal to compensate for the input signal; and
a weight adjuster suitable for increasing the weight when the received signal is at a logic low level and decreasing the weight when the received signal is at the logic high level during the training operation,
wherein during the training operation, the input signal toggles between the logic low level and the logic high level, and the receiver is enabled when the input signal is at the logic high level.

9. A method of adjusting a weight of a compensator, comprising:
applying an input signal to toggle between logic low and logic high levels;
generating a received signal by comparing the input signal and a target voltage having a target value for the input signal to be at the low level when the input signal is at the logic low level;

increasing a weight when the received signal is at the logic high level or decreasing the weight when the received signal is at the logic low level; and compensating for the input signal by applying the weight to the received signal.

10. A method of adjusting a weight of a compensator, comprising:

applying an input signal to toggle between logic high and logic low levels;

generating a received signal by comparing the input signal and a target voltage having a target value for the input signal to be at the logic high level when the input signal is at the logic low level;

increasing a weight when the received signal is at the logic low level or decreasing the weight when the received signal is at the logic high level; and compensating for the input signal by applying the weight to the received signal.

11. A signal receiver circuit that operates based on a plurality of phase clocks having different phases, the signal receiver circuit comprising:

a first receiver suitable for generating a first received signal based on comparison of an input signal with a reference voltage during a normal operation and based on comparison of the input signal with a target voltage during a training operation, and for operating in synchronization with a first phase clock;

a second receiver suitable for generating a second received signal based on comparison of the input signal with the reference voltage during the normal operation and based on comparison of the input signal with the target voltage during the training operation, and for operating in synchronization with a second phase clock;

a third receiver suitable for generating a third received signal based on comparison of the input signal with the reference voltage during the normal operation and based on comparison of the input signal with the target voltage during the training operation, and for operating in synchronization with a third phase clock;

a fourth receiver suitable for generating a fourth received signal based on comparison of the input signal with the reference voltage during the normal operation and based on comparison of the input signal with the target voltage during the training operation, and for operating in synchronization with a fourth phase clock;

a first compensator suitable for applying a first weight to the fourth received signal, applying a second weight to the third received signal, and applying a third weight to the second received signal to compensate for a receiving operation of the first receiver;

a second compensator suitable for applying the first weight to the first received signal, applying the second weight to the fourth received signal, and applying the third weight to the third received signal to compensate for a receiving operation of the second receiver;

a third compensator suitable for applying the first weight to the second received signal, applying the second weight to the first received signal, and applying the third weight to the fourth received signal to compensate for a receiving operation of the third receiver;

a fourth compensator suitable for applying the first weight to the third received signal, applying the second weight to the second received signal, and applying the third weight to the first received signal to compensate for a receiving operation of the fourth receiver;

a first weight adjuster suitable for adjusting the first weight based on the first received signal during the training operation;

a second weight adjuster suitable for adjusting the second weight based on the second received signal during the training operation; and a third weight adjuster suitable for adjusting the third weight based on the third received signal during the training operation.

12. The signal receiver circuit of claim 11, wherein during the training operation, the input signal has a first level at a rising edge of the first phase clock, the first level at a rising edge of the second phase clock, the first level at a rising edge of the third phase clock, and a second level at a rising edge of the fourth phase clock.

13. The signal receiver circuit of claim 12, wherein the target voltage has a target value for the input signal to be at the first level.

14. The signal receiver circuit of claim 13, wherein during the training operation, active periods of the first to third weight adjusters do not overlap with each other, and the first to third weight adjusters are sequentially enabled.

15. The signal receiver circuit of claim 13, wherein during the training operation, the first to third weight adjusters are enabled at the same time.

16. The signal receiver circuit of claim 13, further comprising a selector suitable for providing the reference voltage to the first to fourth receivers during the normal operation, and for providing the target voltage to the first to fourth receivers during the training operation.

* * * * *